Figure 1:
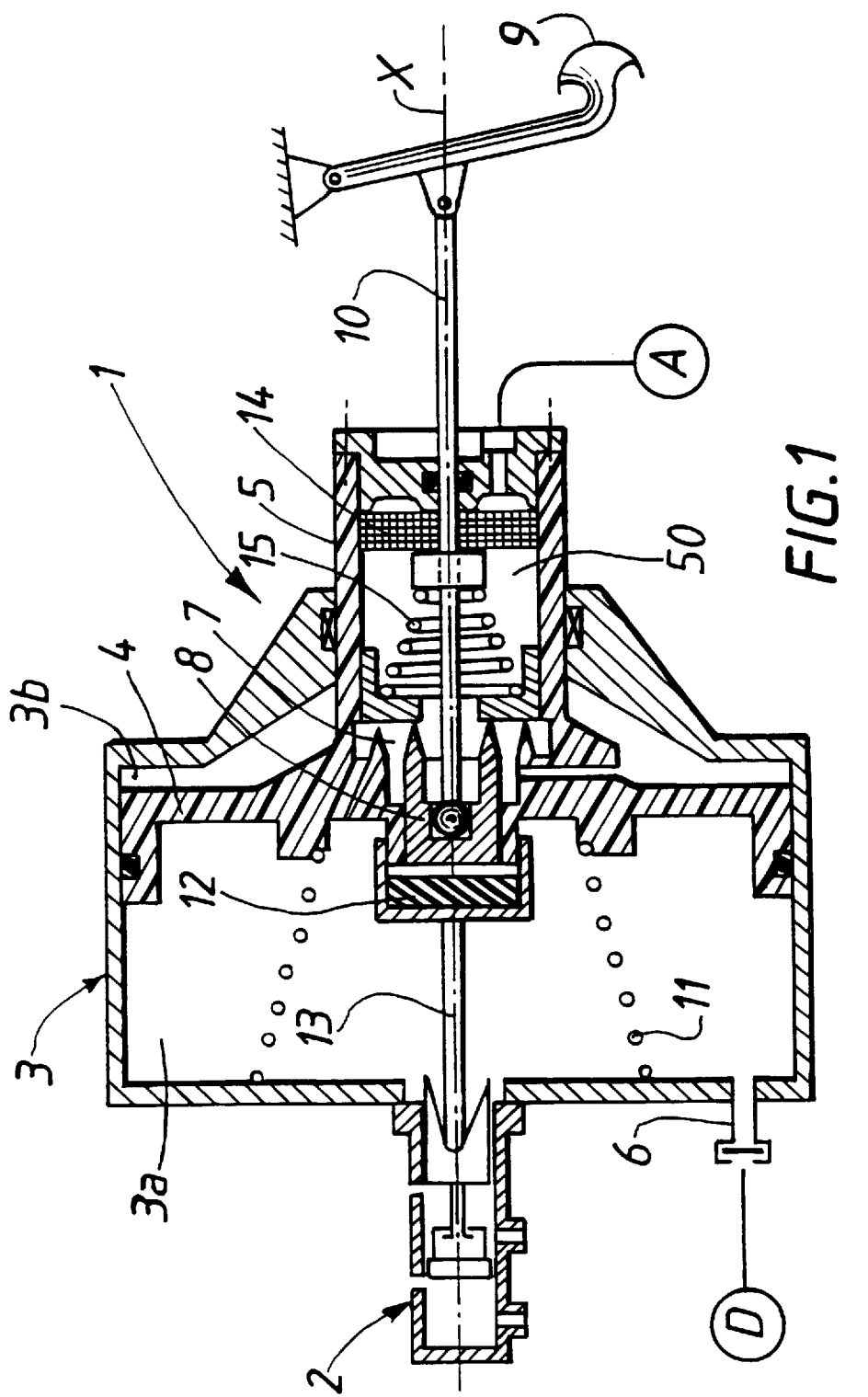

United States Patent

Schewe

[19]

[11] Patent Number: 5,842,403
[45] Date of Patent: Dec. 1, 1998

[54] BOOSTER WITH ADDITIONAL AIR VALVE ON THE OPERATING ROD

[75] Inventor: Jorg Schewe, Paris, France

[73] Assignee: Bosch Systems De Freinage, Drancy, France

[21] Appl. No.: 624,566

[22] PCT Filed: Mar. 12, 1996

[86] PCT No.: PCT/FR96/00376

§ 371 Date: Apr. 10, 1996

§ 102(e) Date: Apr. 10, 1996

[87] PCT Pub. No.: WO96/36517

PCT Pub. Date: Nov. 21, 1996

[30] Foreign Application Priority Data

May 17, 1995 [FR] France .................................. 95 05792

[51] Int. Cl.⁶ .................................................. F15B 9/10
[52] U.S. Cl. .................................................. 91/376 R
[58] Field of Search .................. 91/369.1, 369.2, 91/376 R

[56] References Cited

U.S. PATENT DOCUMENTS

| | | | |
|---|---|---|---|
| 3,972,263 | 8/1976 | Welsh, Jr. ................................ | 91/6 |
| 4,103,590 | 8/1978 | Putt ....................................... | 91/376 R |
| 5,233,908 | 8/1993 | Gautier et al. ........................ | 91/376 R |
| 5,249,504 | 10/1993 | Gautier et al. ........................ | 91/376 R |
| 5,350,224 | 9/1994 | Nell et al. .............................. | 91/376 X |

*Primary Examiner*—Hoang Nguyen
*Attorney, Agent, or Firm*—Leo H. McCormick, Jr.

[57] ABSTRACT

A pneumatic brake booster having first and second sources of air pressure for developing an output force. The booster has a rigid casing (3) divided by a leaktight moving partition (4) into a first chamber 3(a) and a second chamber 3(b). The moving partition being moved by a difference in the fluid pressures prevailing between the first chamber 3(a) and the second chamber 3(b) to drive a pneumatic piston (5) which carries a valve (7). The valve (7) being actuated by an operating rod (10). The inside (50) of the piston (5) is separated from the second source of air pressure by a purification filter (14). The operating rod (10) slides in a sleeve (16) and which passes through the purification filter (14) has a widened part (100). The widened part (100) together with one end (162) of the sleeve (16) forms an additional valve allowing an additional and direct air intake into the piston (5) in the event of an abrupt application designed to effect a substantial braking force.

2 Claims, 3 Drawing Sheets

BOOSTER WITH ADDITIONAL AIR VALVE ON THE OPERATING ROD

The present invention relates to a pneumatic brake booster using first and second sources of air pressure delivering first and second respective and different pressures, this booster comprising a rigid casing divided by at least one leaktight moving partition into at least two chambers, the first of which is connected to the first source, and the second of which can be connected selectively, by means of a valve, to either one of the two sources, it being possible for the moving partition to be urged by the difference in the pressures prevailing in the chambers in order to drive along an essentially cylindrical pneumatic piston sliding in leaktight fashion with respect to the casing and bearing the valve, the inside of this piston being separated from the second source by a purification filter, and the valve being actuated by an operating rod capable of sliding with respect to the piston along an axis from a position of rest to a forward actuating position.

Devices of this type are well known in the prior art, and for instance disclosed in the U.S. Pat. No. 3,972,263.

Despite the traditional nature of the techniques involved, boosters continue to form the subject of substantial, research, aiming to optimize their operating characteristics.

Among this research feature especially attempts to reduce both the noise level of boosters in operation and their response time following actuation, the simultaneous reduction in these two parameters being made very difficult by the fact that a booster is all the quieter if the air it lets into the rear chamber is filtered to a greater extent, while it has a response time which is all the shorter if the air it lets in is filtered to a lesser extent.

This problem is already disclosed in the previously mentioned U.S. Pat. No. 3,972,263, and solved in this prior patent by the use of a compressible filter, which is compressed in response to an input force of high value, so as to increase the air flow and to reduce the response time of the booster.

However, such an arrangement implies the use of a push rod having several sections, and leads to a specific choice of the material used for the filter.

The invention falls within this context, and its object is to provide a booster which meets the expectations of the public as regards reduction in noise level in operation, while at the same time offering a response time which is at least as satisfactory as those of boosters of the prior art, in all cases where the need for a short response time is felt.

To this end, the booster of the invention is essentially characterized in that the operating rod slides in a sleeve which passes axially through the purification filter, in that the sleeve and the operating rod have first and second respective sections facing one another, at least the second of which extends along the said axis, these sections adopting different relative positions depending on whether the operating rod is in its position of rest or in its forward actuating position, and in that the respective sections of the operating rod and of the sleeve cause there to appear between them, when the operating rod is in its forward actuating position, an air passage which is set up between the second source and the inside of the piston, and which is, in contrast, closed off by the respective sections of the operating rod and of the sleeve when the operating rod is in its position of rest.

The sleeve preferably includes internal guide pegs allowing the operating rod to be centered with respect to the sleeve.

Figure 2:
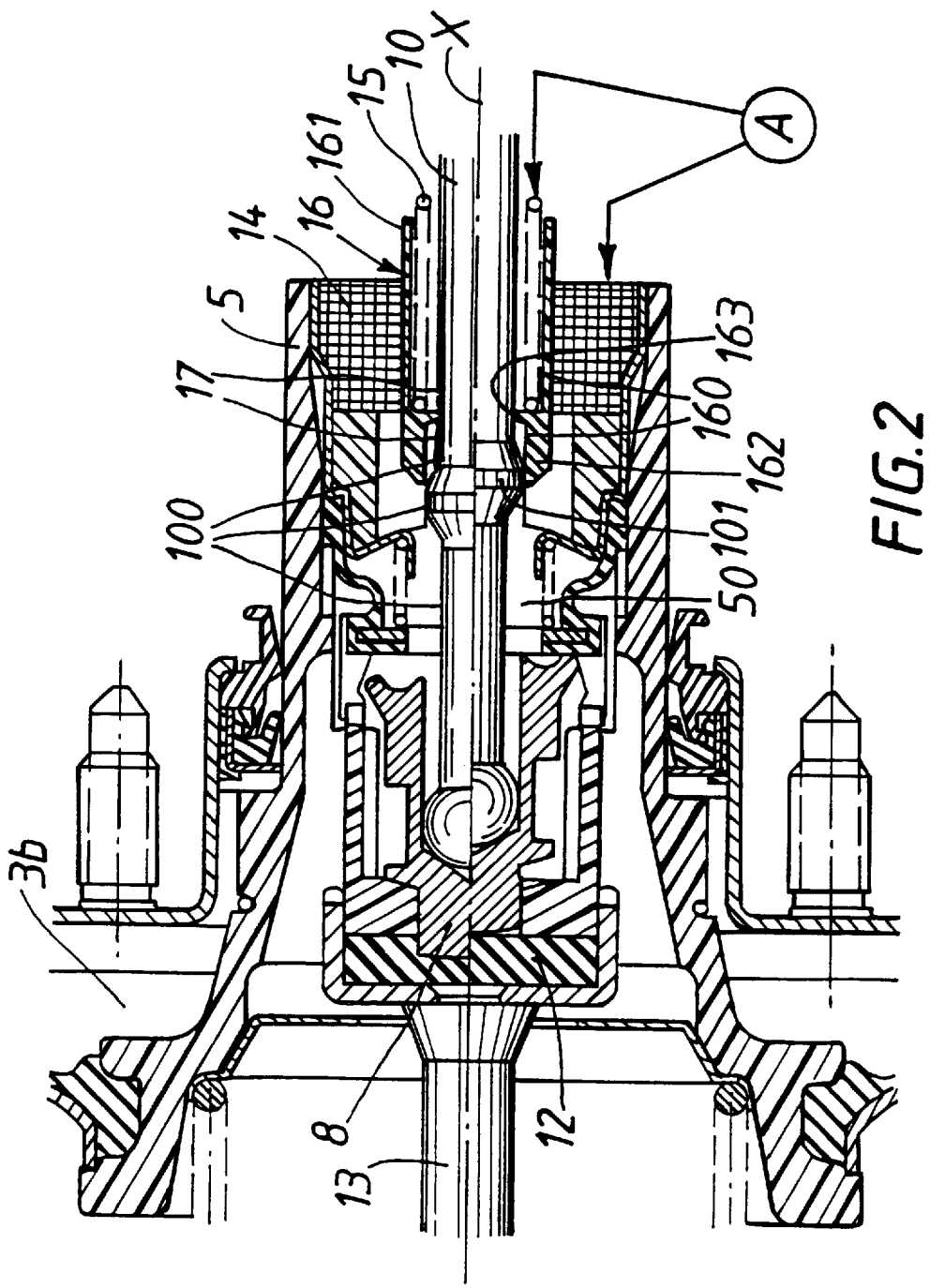
Figure 3:
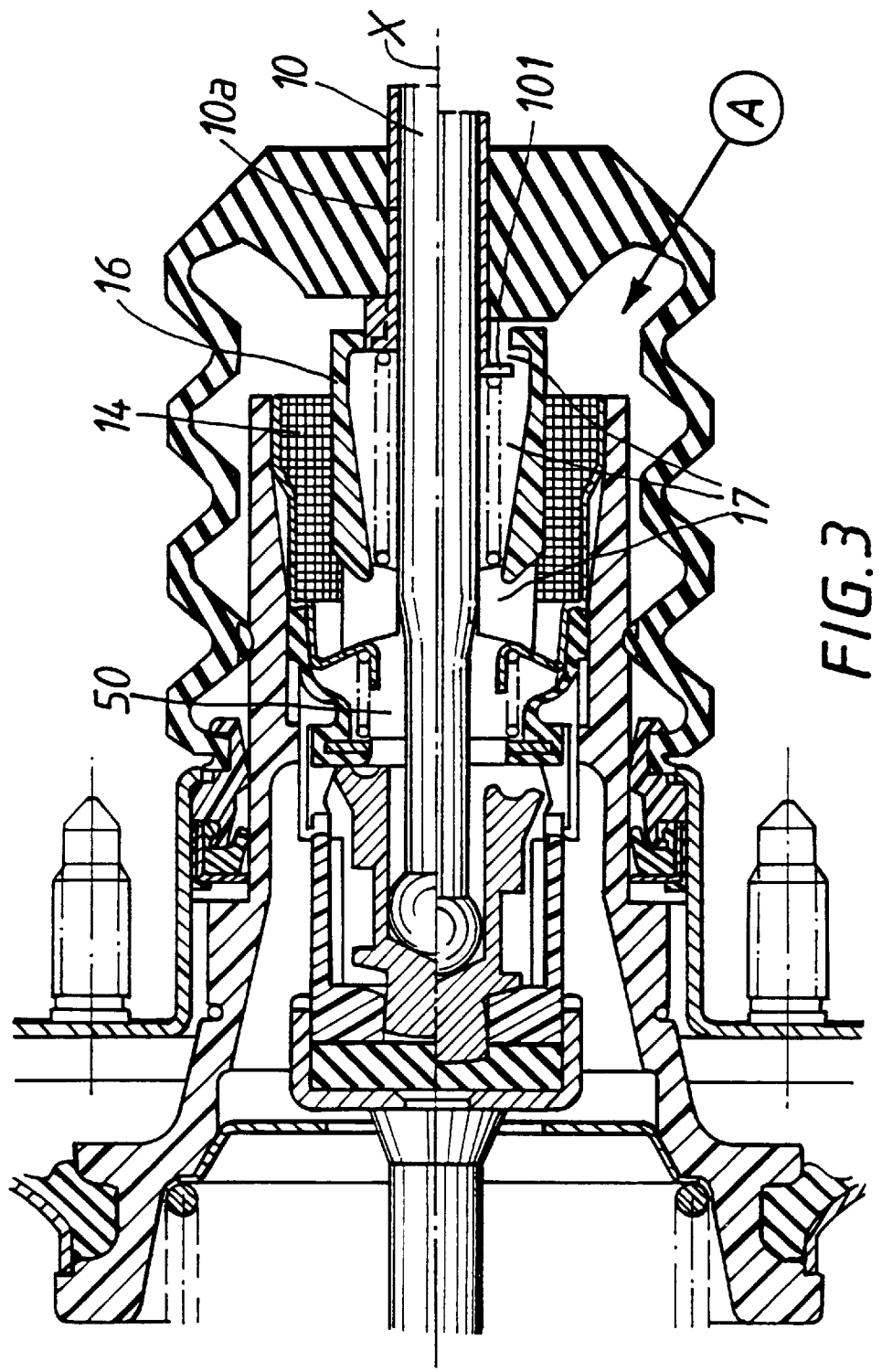

Other features and advantages of the invention will emerge clearly from the description thereof which is given hereafter by way of non-limiting indication with reference to the appended drawings in which:

FIG. 1 is a diagrammatic sectional view of a pneumatically boosted braking system using a conventional booster;

FIG. 2 is a part sectional view of a booster in accordance with a first possible embodiment of the invention, the lower part of which represents the operating rod in the position of rest, and the upper part of which represents the operating rod in the forward actuating position; and FIG. 3 is a part sectional view of a booster in accordance with a second possible embodiment of the invention, the upper part of which represents the operating rod in the position of rest, and the lower part of which represents the operating rod in the forward actuating position.

Insofar as the invention relates merely to an improvement made to pneumatically boosted braking systems and as the general construction and operation of the latter are well known to the person skilled in the art, these systems will be recalled briefly here merely to give total understanding of the improvement that the invention represents.

Roughly, a system of this type comprises a booster 1 and a master cylinder 2.

The booster itself comprises a rigid casing 3 divided into two chambers 3a and 3b in leaktight fashion by a moving partition 4 which can drive along an essentially cylindrical pneumatic piston 5, which can move inside the casing 3.

The front chamber 3a, the front face of which is closed in leaktight fashion by the master cylinder 2 is permanently connected to a source of low pressure D through a non-return valve 6.

The rear chamber 3b in contrast can be connected selectively either to the source of low pressure D, or to a source of high pressure, for example to the atmosphere A.

To this end, access to the rear chamber 3b is controlled by a valve 7 and a plunger 8, the latter being connected to a brake pedal 9 via an operating rod 10 capable of sliding along an axis X with respect to the piston 5.

As long as the operating rod 10 is not actuated, that is to say in this case for as long as it is pulled to the right, the valve 7 normally establishes communication between the two chambers 3a and 3b of the booster.

As the rear chamber 3b is therefore subjected to the same partial vacuum as the front chamber 3a, the piston 5 is pushed back to the right, to the position of rest, by a return spring 11.

The actuation of the plunger 8, obtained by a movement of the operating rod 10 to the left, effected against the force exerted by a return spring 15 firstly has the effect of shifting the valve 7 so that it isolates the chambers 3a and 3b from one another then, secondly, of shifting this valve so that it opens the rear chamber 3b to atmospheric pressure A.

The difference in pressure between the two chambers, then felt by the moving partition 4, exerts on the latter a thrust which tends to shift it to the left and allow it to drive along the piston 5 which in turn shifts, compressing the spring 11.

The braking force exerted on the plunger 8 by the operating force 10, or "input force", and the brake-boosting force or "boost force", resulting from the thrust of the moving partition 4, combine on a reaction disk 12 in order to constitute an actuating force transmitted to the master cylinder via a push rod 13.

As FIG. 1 shows, the booster conventionally comprises a purification filter 14, intended to avoid any contamination by the atmosphere A of the inside 50 of the pneumatic piston, of the valve 7 and of the rear chamber 3b.

Although such a filter is necessary at least for attenuating the operating noise of the booster, it slows down the air flow that the latter can use, and downgrades the response time of the booster in a way which is all the more perceptible as the acoustic insulation provided is high.

In order to overcome this problem, the booster of the invention includes controlled-opening closing-off means installed between the second source of pressure A and the inside 50 of the piston, and illustrated in FIG. 2.

According to the invention, the operating rod 10 slides in a sleeve 16 which is fixed with respect to the piston 5 and which passes axially through the purification filter 14, this sleeve therefore having a first end 161 outside the piston 5 and a second end 162 inside this piston.

Moreover, the sleeve 16 and the operating rod 10 have first and second respective sections 160 and 100 facing one another, at least the second of which extends along the axis X, the operating rod having an enlarged part 101 for example.

As the operating rod can slide with respect to the piston 5, these sections 160 and 100 adopt different relative positions depending on whether the operating rod 10 is in its position of rest or in its forward actuating position.

The present invention benefits from this movement by contriving for the respective sections of the operating rod and of the sleeve to be shaped so as to cause there to appear between them, when the operating rod 10 is in its forward actuating position, an air passage 17 which is set up between the second source A and the inside 50 of the piston, and which is, in contrast, closed off by these sections 160 and 100 when the operating rod 10 is in its position of rest.

For example, according to the embodiment of FIG. 2, the operating rod 10 has an enlarged part 101 which penetrates the second end 162 of the sleeve 16 and closes it off when the operating rod is in its position of rest (lower half of FIG. 2), and which comes out of the second end 162 of the sleeve and frees it when the operating rod 10 is in its forward actuating position (upper half of FIG. 2), in order to allow the air passage 17 to be set up between the second source of pressure A and the inside 50 of the piston.

The operation of this arrangement is as follows.

So long as a zero or moderate braking force is applied to the operating rod 10, the latter adopts, with respect to the piston 5, the position illustrated in the lower half of FIG. 2, or a position slightly further forward but in which the enlarged part 100 still closes off the second end 162 of the sleeve 16.

In contrast, when a substantial braking force is abruptly applied to the operating rod 10, the latter adopts, with respect to the piston 5, the position illustrated in the upper half of FIG. 2, it then being possible for air to flow freely from the second source of pressure A as far as the internal volume 50 of the piston 5 through the passage 17.

As the air thus let into the booster does not pass through the filter, it undergoes no slowing-down effect on the part of the latter.

As the person skilled in the art will readily understand, this arrangement makes it possible simultaneously to choose a filter which gives substantial acoustic insulation and nevertheless to obtain a minimum response time in emergency braking situations in which the comfort of a low noise level is of no importance.

As FIG. 2 shows, the sleeve 16 may furthermore include internal guide pegs 163 allowing the operating rod 10 to be centered with respect to the sleeve 16.

As the second embodiment of the invention illustrated in FIG. 3 shows, the change in section 100 of the operating rod may be obtained by virtue of the use of an attached part 10a and may be localized to close to the outer end 161 of the sleeve 16, the expert thus being invited to understand that the enlarged part 101 of the operating rod may, more generally, be provided at any point along the length of the sleeve 16, and be achieved by any means.

I claim:

1. A pneumatic brake booster using first and second sources of air pressure for delivering first and second respective and different pressures, said booster having a rigid casing divided by at least one leaktight moving partition into at least first and second chambers, said first chamber being connected to said first source of air pressure, said second chamber being connected selectively, by means of a valve, to one of said first and second sources of air pressure in order to urge said moving partition by a difference in the pressures prevailing in said first and second chambers to drive an essentially cylindrical pneumatic piston sliding in leaktight fashion with respect to said casing, said valve being carried by said pneumatic piston, said pneumatic piston having an inside which is separated from the second source of air pressure by a purification filter, and said valve being actuated by an operating rod capable of sliding with respect to said pneumatic piston along an axis from a position of rest to a forward actuating position, characterized in that said operating rod slides in a sleeve which passes axially through said purification filter, said sleeve and said operating rod having first and second respective sections facing each another with at least said second section extending along the said axis, said first and second sections having different relative positions depending on whether said operating rod is in its position of rest or in its forward actuating position, said operating rod and of the sleeve developing an air passage between said first and second sections when said operating rod is in its forward actuating position, said air passage being connecting said second source of air pressure with the inside of said pneumatic piston, said air passage beign closed off by the engagement of said first section of the operating rod and said second section of the sleeve when said operating rod is in its position of rest.

2. The pneumatic booster according to claim 1, characterized in that said sleeve includes internal guide pegs for centering said operating rod with respect to said sleeve.

* * * * *